United States Patent [19]
Turley et al.

[11] 4,279,468
[45] Jul. 21, 1981

[54] OPTICAL FIBER CONNECTORS

[75] Inventors: Wilfred H. Turley; John A. Robinson, both of Northampton, England

[73] Assignee: Plessey Handel und Investments AG, Zug, Switzerland

[21] Appl. No.: 112,085

[22] Filed: Jan. 14, 1980

Related U.S. Application Data

[63] Continuation of Ser. No. 901,801, May 1, 1978, abandoned.

[30] Foreign Application Priority Data

May 2, 1977 [GB] United Kingdom ............... 18239/77

[51] Int. Cl.³ .............................................. G02B 5/14
[52] U.S. Cl. ............................. 350/96.21; 350/96.22
[58] Field of Search .............. 350/96.20, 96.21, 96.22; 339/103 R, 103 B

[56] References Cited

U.S. PATENT DOCUMENTS

| | | | |
|---|---|---|---|
| 3,181,105 | 4/1965 | Roach et al. | 339/103 R X |
| 3,923,371 | 12/1975 | Dalgleish | 350/96.21 |
| 4,043,026 | 8/1977 | Weidhaas et al. | 350/96.21 X |
| 4,045,121 | 8/1977 | Clark | 350/96.21 |
| 4,110,000 | 8/1978 | Bogar et al. | 350/96.21 |
| 4,111,522 | 9/1978 | Auracher et al. | 340/96.21 |
| 4,119,362 | 10/1978 | Holzman | 350/96.21 X |
| 4,146,301 | 3/1979 | Cherin et al. | 350/96.21 |
| 4,149,072 | 4/1979 | Smith et al. | 350/96.21 X |
| 4,162,821 | 7/1979 | Schumacher | 350/96.21 |

FOREIGN PATENT DOCUMENTS 52-42128  4/1977  Japan ........................................ 350/96.21

*Primary Examiner*—John K. Corbin
*Assistant Examiner*—John D. Lee
*Attorney, Agent, or Firm*—Fleit & Jacobson

[57] ABSTRACT

An optical fibre connector comprises two co-operating parts each of which includes a fibre alignment member formed on one plane surface with relatively narrow parallel grooves for receiving the ends of optical fibres and relatively wide grooves accurately positioned relative to the narrow grooves for receiving connector alignment pins or rollers for the accurate alignment of the connector parts and the fibre alignment members thereof, said connector parts also including clamping means for clamping optical fibres in the relatively narrow grooves so that the fibres become compressed into the material of the alignment members and in the case of at least one of the connector parts for clamping one or more connector alignment pins or rollers in the relatively wide grooves.

9 Claims, 5 Drawing Figures

OPTICAL FIBER CONNECTORS

This is a continuation of application Ser. No. 901,801, filed May 1, 1978, abandoned.

This invention relates to optical fibre connectors and relates more specifically to such connectors of the form described in U.S. patent application Ser. No. 873,884, filed Jan. 31, 1978, U.S. Pat. No. 4,214,810, and assigned to the assignees of the present application in which optical fibres are coupled together in end-to-end abutting relationship when co-operating parts of the connector are operatively brought together.

The invention has for an object to provide improved connectors of the general form described in the said U.S. patent application, which permit to achieve, at a moderate cost, a high degree of accuracy in the alignment of the pairs of abutting fibre ends.

A coupling connector for optical fibres has been previously described which consists of two connector members each including a cylindrical holder which terminates in a flat end face and which is formed at its circumference with longitudinal channels having undercut side walls, each channel accommodating the end portion of a light-conducting fibre, which is secured in the channel so as to terminate flush with a flat end face of the holder for butting co-operation of the end of the fibre with the end of another fibre similarly secured in an aligned similar channel of the holder of the other connector member; accurate alignment of the two connector members is to be ensured by centring pins extending from one of the connector members into an aligned guide bore of the other connector member. With this known construction, it is important, in order to achieve accurate alignment of the fibres, that the correct location of each centering pin and that of the corresponding guide bore in relation to the respective fibre-receiving channels of the two holders must be ensured within very narrow tolerances, and as a result the manufacture of a satisfactory coupling connector of this known construction is liable to be very costly.

It is thus an object of the present invention to provide an improved coupling connector which greatly facilitates the manufacture of a connector ensuring a high degree of alignment accuracy.

The present invention consists in an optical-fibre coupling connector which comprises two co-operating connector members, each member including a holder body having a surface provided with parallel channels, each for accommodating an end portion of a fibre that is to be coaxially coupled with a similar fibre end accommodated in a corresponding channel of the other connector member, the connector further including locating-pin elements extending parallel to said channels and being fast in one connector member for guiding co-operation with a locating passage provided in the other connector member, and which is characterized by the fact that the fibre-end accommodation channels are V-grooves provided in a flat surface of an alignment member of each connector member and having walls that converge towards the bottom of each groove, that said flat surface of each connector member is additionally provided with pin-accommodation V-grooves having similarly convergent walls but greater width than said fibre-end accommodation V-grooves, for respectively accommodating the two end portions of each locating-pin element in the two connector members, and that each connector member further includes clamping means for urging said fibre ends towards the bottom of said fibre-accommodation grooves of said connector member and thus securing and, owing to the convergence of the walls of the V-grooves, accurately locating said fibre ends, and for similar co-operation with said locating-pin elements to secure one end of each said pin element in one connector member and guidingly clamp the other end of each pin element in the other connector member by urging each of said ends towards the bottom of the corresponding pin accommodation groove.

The parallel V-grooves in the flat surface of each alignment member can be readily produced with great accuracy, and this fact, combined with the self-centring character of the V-grooves, ensures that, for any given respective diameters of the fibres and locating-pin elements, high accuracy of the alignment of the individual fibre pairs to be coupled can be readily ensured.

The clamping means for the ends of the optical fibres and the clamping means for the connector alignment pins or rollers are preferably separate and in one preferred constructional arrangement especially envisaged one of the connector parts only is provided with two connector alignment pins or rollers which are clamped by clamping means so that they project from one end of the appertaining optical fibre alignment member to facilitate insertion of the projecting portions thereof into guide cavities in the other connector part defined between the relatively wide grooves of the other optical fibre alignment member and a resiliently mounted plate. In this way the end faces of optical fibres clamped to the alignment member of one connector part may be caused to abut directly against the end faces of the optical fibres clamped to the alignment member of the other connector part. Alternatively, it could be arranged that one or more lenses are interposed between the optical fibre end faces for the purpose of providing interconnection between fibres in accordance with the construction set forth in British Pat. No. 1429843.

The connector parts may also include respective housings within which the optical fibre alignment members and clamping means are located, these housings being formed generally as co-operating plug and socket structures which allow floating movement of the optical fibre alignment members therein.

The optical fibres which will be connected to the respective connector parts for interconnection purposes, will usually be contained within a single cable the sheathing of which may be clamped within a recessed part of the alignment members by cable clamping means. For the purpose of restraining longitudinal movement of the cable relatively to the connector part, a cable restraining and sealing arrangement in accordance with our co-pending U.S. patent application Ser. No. 901,804, filed May 1, 1978, and assigned to the Assignees of the present application may be provided. The arrangement may comprise a hollow cylindrical cable entry collar which is attached to or forms part of the housing of the connector part, and through which the cable extends into the latter, said cable entry collar being threaded for threadingly receiving a clamping nut or other member which as it is screwed on to the cable entry collar urges a pair of thrust rings surrounding the cable towards one another thereby deforming a sealing ring interposed between the thrust rings which clamps the cable and at the same time effects sealing between the cable and the cable entry member to prevent ingress of dirt and moisture into the connector part.

By way of example the present invention will now be described with reference to the accompanying drawings in which.

Figure 4:
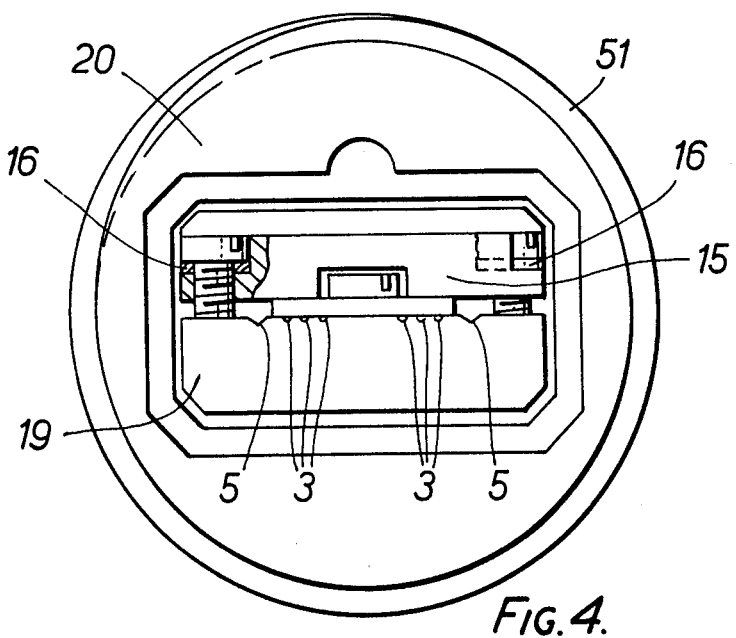
FIG. 4 is a front view of the connector part shown in FIG. 3 taken in the direction B in FIG. 3 and showing a fragment in section; and, FIG. 5 is an exploded view of an optical fibre alignment and clamping arrangement of the connector part shown in FIGS. 1 and 3.
Figure 5:
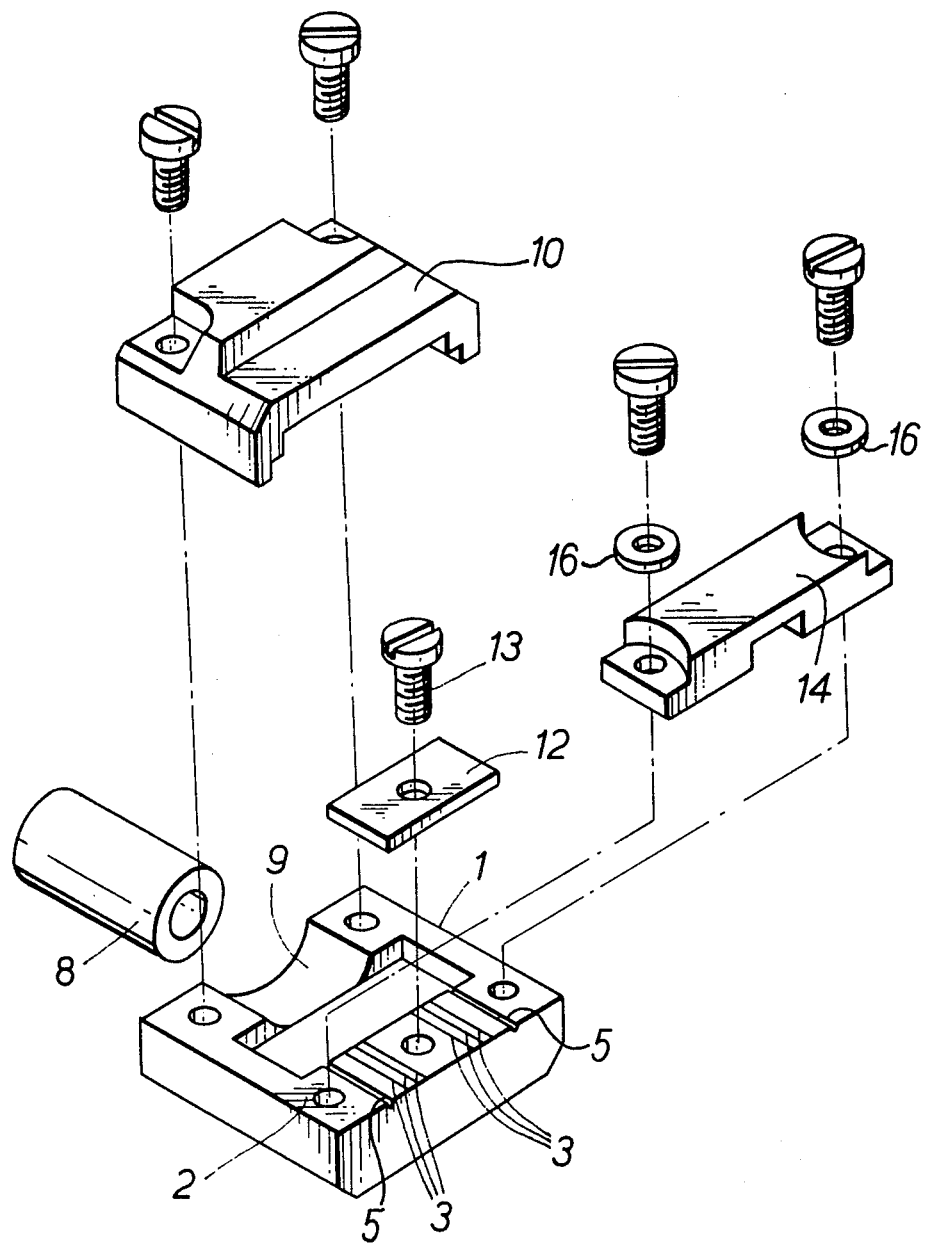

Referring to the drawings, each of the two connector parts shown in FIGS. 1 and 2, and FIGS. 3 and 4, respectively, includes an optical fibre alignment and clamping arrangement shown in exploded form in FIG. 5.

The illustrated connector is constituted by two co-operating parts, hereinafter respectively referred to as plug part A and socket part B. In each of these the optical fibre alignment and clamping arrangement comprises an optical fibre alignment block 1 of cold-deformable material for example of aluminium or aluminium alloy. This block provides a plane surface 2 having formed therein, as by a pressing operation, parallel relatively narrow V-shaped grooves 3 arranged in two sets of three for receiving optical fibres not shown in FIG. 5, but indicated at 4 in FIGS. 1 to 4. Also formed during the same pressing operation so as to ensure precise positional relationship relative to the grooves 3 are two relatively wide V-shaped grooves 5, which are parallel to the grooves 3 and serve for receiving connector part alignment rollers indicated at 6 in FIGS. 1 to 4. This pressing operation is the only precision operation required in the fabrication of the connector, the various connector members being otherwise manufactured according to relatively wide tolerances.

Figure 1:
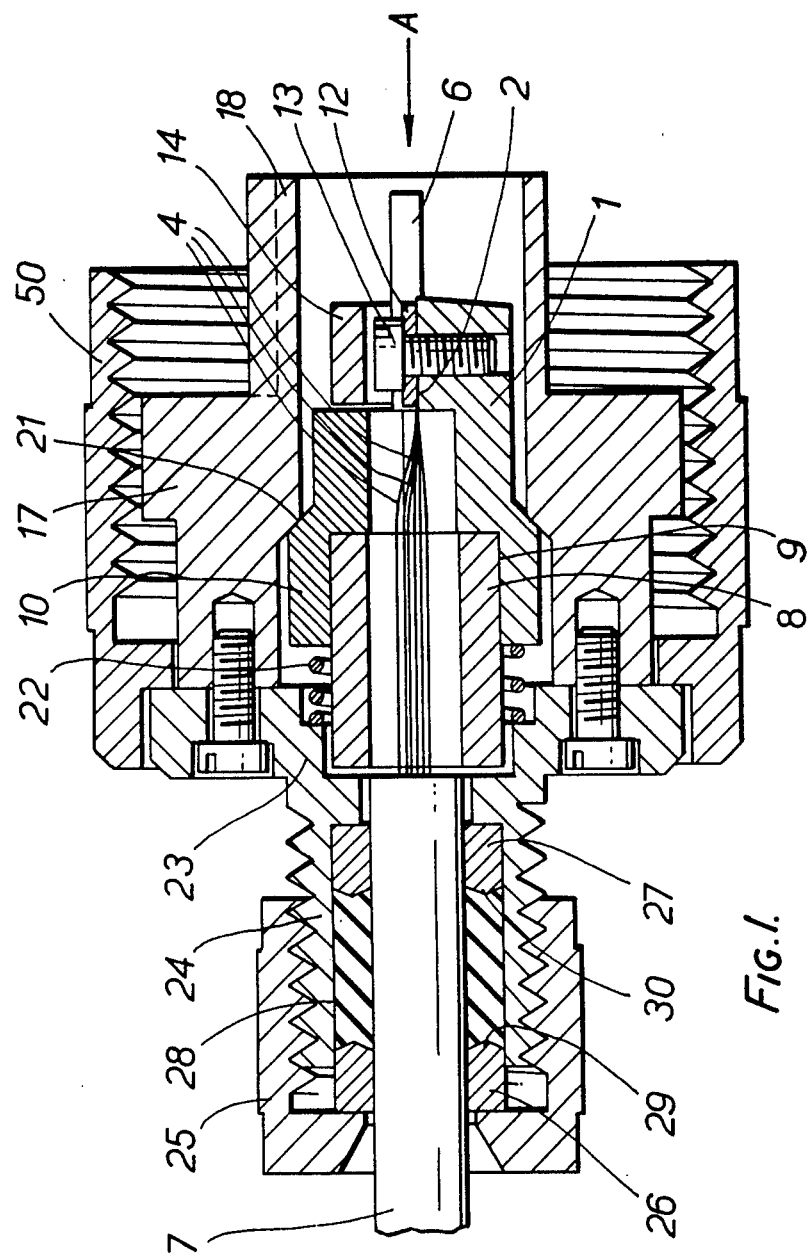
FIG. 1 is a longitudinal cross-sectional view of one part of an optical fibre connector.
Figure 2:
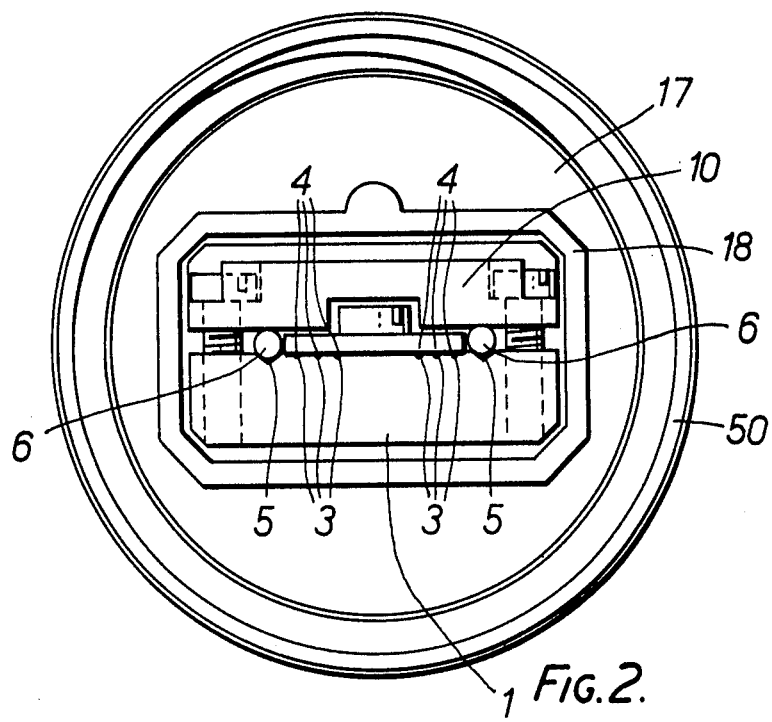
FIG. 2 is a front view of the connector part shown in FIG. 1 taken in the direction A.
Figure 3:
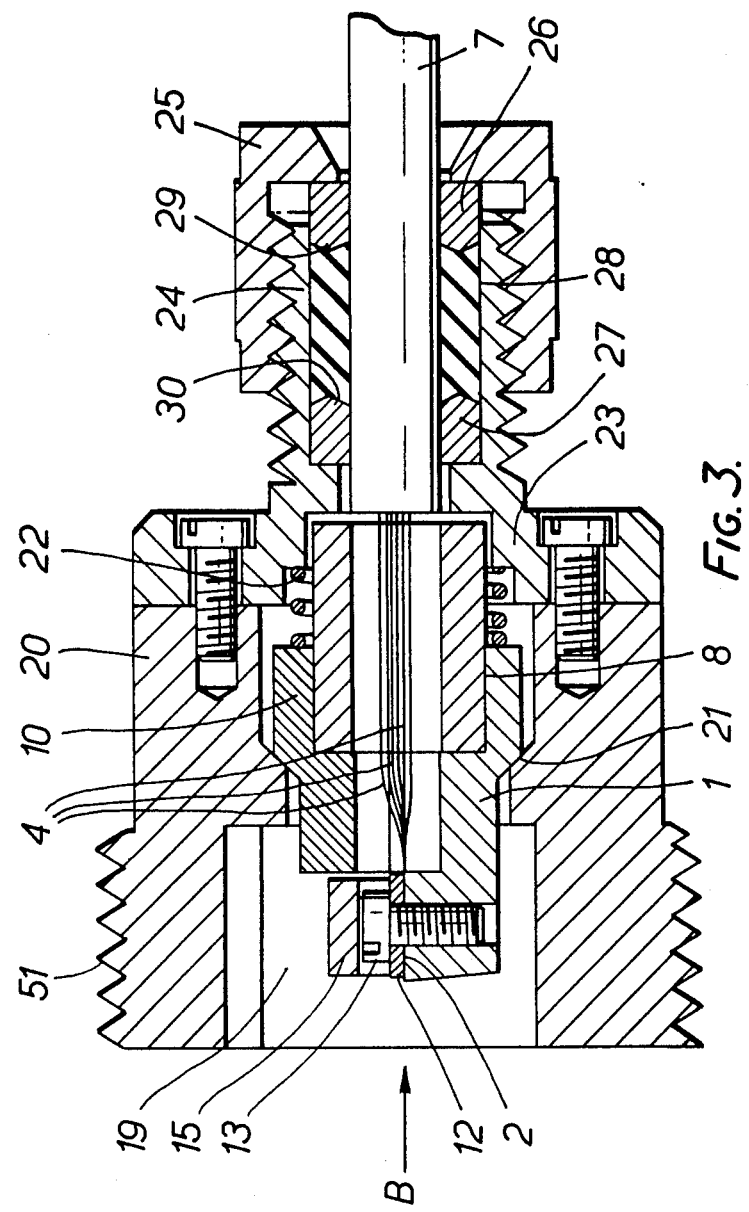
FIG. 3 is a longitudinal cross-sectional view corresponding to FIG. 1 of the other co-operating part of the optical fibre connector.

In use of the connector, in respect of each of the connector parts A and B respectively shown in FIGS. 1 and 2, and in FIGS. 3 and 4, an optical fibre cable 7 passes through a sleeve 8 of resiliently compressible material, for example of neoprene which is clamped in a curved recess 9 of the fibre alignment block 1 by a cable clamp member 10 screwed to the alignment block 1. Optical fibres 4 of the cable 7 are fanned out from the cable end and positioned in the relatively narrow grooves 3 of the alignment block 1. These optical fibres 4 are clamped in the grooves 3 by means of a clamping plate 12 having a screw 13 threaded into the alignment block 1. This clamping action serves to compress the optical fibres into the relatively soft metal of the block 1 as described fully in said co-pending patent application Ser. No. 873,884.

The relatively wide grooves 5 of the plug part A shown in FIGS. 1 and 2, have clamped therein by means of a screw clamp plate 14, shown in detail in FIG. 5 two alignment rollers or pins 6, which project from the front end of the alignment block 1 as shown in FIG. 1 and in order to receive the projecting portions of these rollers or pins, the socket part A of the connector is provided with expandable cavities. As illustrated in FIGS. 3 and 4, these cavities are defined between the relatively wide V-shaped grooves 5 of the alignment block 1 of the socket part B of the connector and a clamp plate 15 which is shaped like the clamp plate 14 of part A shown in FIG. 5 but is resiliently mounted by means of rubber washers 16 to render the cavities expandable. By the introduction of the plug part A of the connector into the socket part B which is facilitated by screwing a coupling nut 50 of the plug part on to a threaded part 51 of the socket part, the co-operating end faces of the optical fibres 4, which are terminated flush with the opposing front faces of the alignment block members 1, will abut against one another, so as to provide low-loss connections between the fibres of the two connector parts. As will be seen from the drawings, the plug part A of the connector includes a generally cylindrical housing 17 having a hollow rectangular boss 18 which is received by a rectangular socket 19 in housing 20 of the socket part with the boss and the socket having co-operating protuberance and groove for correct registration of the connector parts.

The optical fibre alignment and clamping arrangements of the connector parts are arranged to float within their respective housings 17 and 20 by means of co-operating chamfered surfaces 21 (FIGS. 1 and 3) and compression springs 22 acting between the alignment blocks 1 and housing extension members 23. Each of these housing extension members 23 embodies a cable-restraining and sealing arrangement. This arrangement, which forms the subject of the said co-pending application Ser. No. 901,804 comprises a cable entry collar 24 through which the optical fibre cable 7 extends and which threadingly receives a cable clamping nut 25. As this clamping nut 25 is screwed on to the collar 24, a pair of metal thrust rings 26 and 27 are urged towards one another so that a sealing ring 28 (e.g. Neoprene) is deformed by the V-shaped profiles 29 and 30 of the thrust rings so as to effect sealing between the inner periphery of the cable entry collar 24 and the cable 7 and to restrain the cable 7 against longitudinal displacement relative to the connector part housing.

It will be appreciated that although the optical fibre connector specifically described herein in order to demonstrate the principle of operation of the present invention has provision for interconnecting six pairs of optical fibres, the number of interconnections effected between fibres can obviously be varied and other features of the connector may also be changed without departing from the principle of the invention. For example, coupling lenses could be introduced between optical fibres terminated in the two connector parts.

What we claim is:

1. An optical-fibre coupling connector, comprising two co-operating connector members, each member including a holder body having a surface provided with parallel channels each for accommodating an end portion of a fibre that is to be coaxially coupled with a similar fibre end accommodated in a corresponding channel of the other connector member, the connector further including locating-pin elements extending parallel to said channels and being fast in one connector member for guiding co-operation with a locating passage provided in the other connector member, the connector being characterised by the fact that the fibre-end accommodation channels are relatively narrow V-grooves provided in a flat surface of an alignment member of each connector member and having walls that converge towards the bottom of each groove, that said flat surface of each connector member is additionally provided with relatively wide pin-accommodation V-grooves having similarly convergent walls but greater width than said fibre-end accommodation V-grooves, for respectively accommodating the two end portions of each locating-pin element in the two connector members, and that each connector member further includes clamping means for urging said fibre ends towards the bottom of said fibre-end accommodation V-grooves of said connector member and thus securing and, owing to the convergence of the walls of the V grooves, accurately locating said fibre ends, and for similar co-operation with said locating-pin elements to secure one end of each said locating-pin element in one connector member and guidingly clamp the other end of each locating-pin element in the other connector member by urging each of said ends towards the bottom of the corresponding pin accommodation V-groove.

2. An optical-fibre coupling connector as claimed in claim 1, wherein the clamping means for clamping the locating pin elements in the relatively wide grooves of an alignment member are separate from the clamping means for clamping and holding the fibre ends in the relatively narrow grooves of the same alignment member.

3. An optical-fibre coupling connector as claimed in claim 2, wherein one of the connector members is equipped with two pin elements which are secured in such relatively wide grooves of the alignment member thereof by such clamping means, and wherein the other connector member is equipped with clamping means for co-operation with the projecting portions of said pin elements, which include a clamping plate which is resiliently mounted to define, with such relatively wide grooves of the alignment member of said other connector member, resiliently expanding guide cavities for respective co-operation with said projecting portions of said pin elements.

4. An optical-fibre coupling connector as claimed in claim 1, wherein each connector member includes a housing in which the fibre-alignment member of said member is accommodated together with the clamping means for co-operation with said alignment member, the housings of the two connector members being formed as mutually co-operating plug-and-socket structures, and each fibre-alignment member being mounted in its respective housing for angularly floating support.

5. An optical-fibre coupling connector as claimed in claim 4, wherein each connector member includes cable-clamping means for restraining longitudinal movement of a cable containing the individual fibres whose ends are clamped in the relatively narrow grooves of the alignment member of said connector member, said cable-clamping means being arranged in a recess formed in the housing of the connector member.

6. An optical-fibre coupling connector as claimed in claim 5, wherein each such recess is a substantially cylindrical bore, and wherein the cable-clamping means comprises a sealing bush of a material whose mechanical characteristics are similar to those of neoprene, said bush surrounding the cable and being accommodated in said cylindrical recess, and means for axially compressing said bush in said recess, thereby establishing sealing contact of the bush with said cylindrical bore and with the cable.

7. An optical-fibre coupling connector as claimed in claim 1, wherein the groove-receiving material in which the V-grooves are provided, is soft aluminium or other similarly soft material, so that when the fibres to be coupled are of glass or similarly hard material, the action of the clamping means will cause the fibres to be compressed into the groove-receiving material.

8. An optical-fibre coupling connector as claimed in one of claims 2 to 6, 1, or 7, wherein each said clamping means includes a clamping member which has a surface facing the said flat surface of such fibre-alignment member, said clamping member being arranged to be urged towards said alignment member for exerting a depression force upon and confining the fibre ends and pin elements in their respective V-grooves.

9. An optical-fibre coupling connector as claimed in claim 1, in which one of the two connector members includes two locating-pin elements, each located in one of the two relatively wide V-grooves and clamped by the clamping means of said one connector member so that they both project from one end of the alignment member of said one connector member, the other connector member having locating passages for the introduction of said locating pin element of said one connector member, said locating passages being formed by the relatively wide pin-accommodation V-grooves of the alignment member in co-operation with a resiliently mounted plate member forming part of said other connector member.

* * * * *